United States Patent [19]

Buckley et al.

[11] Patent Number: 5,311,222
[45] Date of Patent: * May 10, 1994

[54] PRISM ASSEMBLY

[75] Inventors: Galen L. Buckley, Dana Point; Kenneth G. Selesky, San Juan Capistrano; Daniel M. Houston, Costa Mesa, all of Calif.

[73] Assignee: Pyramid Optical, Irvine, Calif.

[ * ] Notice: The portion of the term of this patent subsequent to Jun. 10, 2007 has been disclaimed.

[21] Appl. No.: 244,711

[22] Filed: Sep. 14, 1988

[51] Int. Cl.⁵ ............................................. G02B 5/122
[52] U.S. Cl. ........................................ 359/529; 356/5
[58] Field of Search ............... 350/102, 104, 242, 243, 350/245, 246, 252, 286, 632; 356/5, 6, 7, 9, 19; 33/282, 283, 290, 293, 299

[56] References Cited

U.S. PATENT DOCUMENTS 4,311,382 1/1982 Buckley et al. ..................... 356/5
4,343,550 8/1982 Buckley et al. ..................... 356/5
4,470,664 9/1984 Shiragawa ........................ 350/102

Primary Examiner—Rodney B. Bovernick
Assistant Examiner—Loha Ben

[57] ABSTRACT

A miniature prism assembly which in its preferred embodiment utilizes a one inch prism, a stationary target, a yoke, and a housing bracket, all in an integrated unit which can be strung with a plumb line without removing the reflective prism housing from the yoke and which can be strung in the same manner irrespective of whether the prism is adjusted for a 0 or 30 millimeter offset and while the target remains with the yoke. Further, the present invention utilizes a stationary target easily mounted and having a center line that does not alter its position irrespective of the elevation of the prism. The novel yoke and target of the present invention permit the stringing of a plumb line while the target remains affixed to the yoke by utilizing unique bushings and dual purpose slots which permit plumb line stringing around the periphery of the yoke and simultaneously assist to retain the target.

11 Claims, 6 Drawing Sheets

PRISM ASSEMBLY

BACKGROUND OF THE INVENTION

1. Field of the Invention

The present invention relates generally to prism assemblies used for measuring precise distances such as in surveying and more particularly, to an integrated prism assembly which is adjustable in elevation, has selectable offsets, provides a stationary target and a level and which can accommodate a plumb line for accurate positioning of the assembly with a minimum of inconvenience.

2. Prior Art

The use of prism assemblies in the surveying art as retroreflectors for precisely measuring distances is well-known. By way of example, see U.S. Pat. No. 4,343,550 which is assigned to the assignee of the present invention. Typically such prism assemblies tend to be relatively large, cumbersome structures utilizing one or more three inch diameter prisms, associated targets to permit easier sighting and complex brackets to permit elevation adjustment and offset variation in the field. However with technological improvements in laser optics and particularly in regard to the distance measurement capabilities of laser distance measuring instrumentation, there has been a recent trend in the industry toward the use of smaller prism assemblies which employ one inch prisms and a relatively miniaturized structure associated with such prisms to permit a greater degree of portability and convenience in the field. Such smaller and simpler prism assemblies typically can be carried in a coat pocket or small pouch that may be attached to a belt of the user thereby significantly increasing the convenience of making a large plurality of measurements at different locations in the field over the course of a work day. There is however a trade-off that one must make between convenience of portability and performance capabilities. More specifically, the more portable one wishes to make these miniaturized prism assemblies, the more difficult it becomes to provide certain performance characteristics such as vertical alignment positioning capability, ease of sighting from a long distance, leveling capability, ease of offset and elevation adjustment and the like. On the other hand, in general, the more these performance characteristics the prism assembly is designed to possess, the more difficult it becomes to provide miniaturization and portability and ease of use in the field.

FIGS. 1-8 of the accompanying drawings illustrate various configurations of prior art miniature retroreflective prism assemblies of the type hereinabove discussed and reveal various ways in which there has been an attempt in the prior art miniature prism field to accommodate the desire for both portability and performance. Thus, for example some of the prior art configurations shown in FIGS. 1-8 of the accompanying drawings illustrate the capability of providing a plumb line and elevational control to position the prism at a desired location and direction for improving measurement capability. Other configurations of the prior art shown in the accompanying drawings illustrate the ability to change the offset of the prism such as between 0 and 30 millimeters and still other prior art configurations have a target to improve the sightability of the prism from a remote location where the laser instrumentation may be located.

Unfortunately, none of the aforementioned prior art disclosed herein and otherwise known to the applicants, provides a miniature prism assembly capable of each one of the aforementioned features in an integrated unit which can be strung for a plumb line without moving the reflective prism housing from the yoke, which allows the plumb line to be strung in the same manner for 0 and 30 millimeter offset and which allows stringing of the plumb line while a stationary target remains on the yoke. Perhaps most importantly, there is no known prior art portable prism assembly that uses a stationary target which is easily mounted and which does not present any inaccuracies in the distance measurement because the center line does not move when the prism is tilted. There has therefore been a long-felt need for a miniature prism assembly of the type generally described above, but which provides all such features in one combined unit and also overcomes the aforementioned deficiencies of the prior art.

SUMMARY OF THE INVENTION

The present invention solves the aforementioned long-felt need by providing a miniature prism assembly which in its preferred embodiment utilizes a 1.4 inch prism, a stationary target, a yoke, and a housing bracket, all in an integrated unit which can be strung with a plumb line without removing the reflective prism housing from the yoke and which can be strung in the same manner irrespective of whether the prism is adjusted for a 0 or 30 millimeter offset and while the target remains with the yoke. Further, the present invention utilizes a stationary target easily mounted and having a center line that does not alter its position, irrespective of the elevation of the prism. The novel yoke and target of the present invention permit the stringing of a plumb line while the target remains affixed to the yoke by utilizing unique bushings and dual purpose slots which permit plumb line stringing around the periphery of the yoke and simultaneously assist to retain the target.

OBJECTS OF THE INVENTION

It is therefore a principal object of the present invention to provide a portable prism assembly for surveying and the like which overcomes the aforementioned deficiencies of the prior art by providing an integrated unit having selectable offset and adjustable elevation while being adapted for being strung with a plumb line without requiring any other parts and without requiring removal and reassembly of the prism housing to any such parts.

It is an additional object of the present invention to provide an integrated portable prism assembly which is provided with a stationary target that is easily mounted to the assembly and which provides an accurate indication of centering of the prism for sighting purposes irrespective of the elevation angle of the prism.

It is still an additional object of the present invention to provide an integrated portable prism assembly designed to be operated with a plumb line and including a level for accurate placement of the prism assembly relative to a distance measuring instrument and in which the plumb line may be attached to the prism assembly in the same manner whether the prism is connected for 0 or 30 millimeter offset and without requiring any disassembly and reassembly of the invention.

BRIEF DESCRIPTION OF THE DRAWINGS

The aforementioned objects and advantages of the present invention as well as additional objects and advantages thereof will be more fully understood hereinafter as a result of a detailed description of a preferred embodiment of the invention when taken in conjunction with the following drawings in which.

DETAILED DESCRIPTION OF A PREFERRED EMBODIMENT

Figure 1:
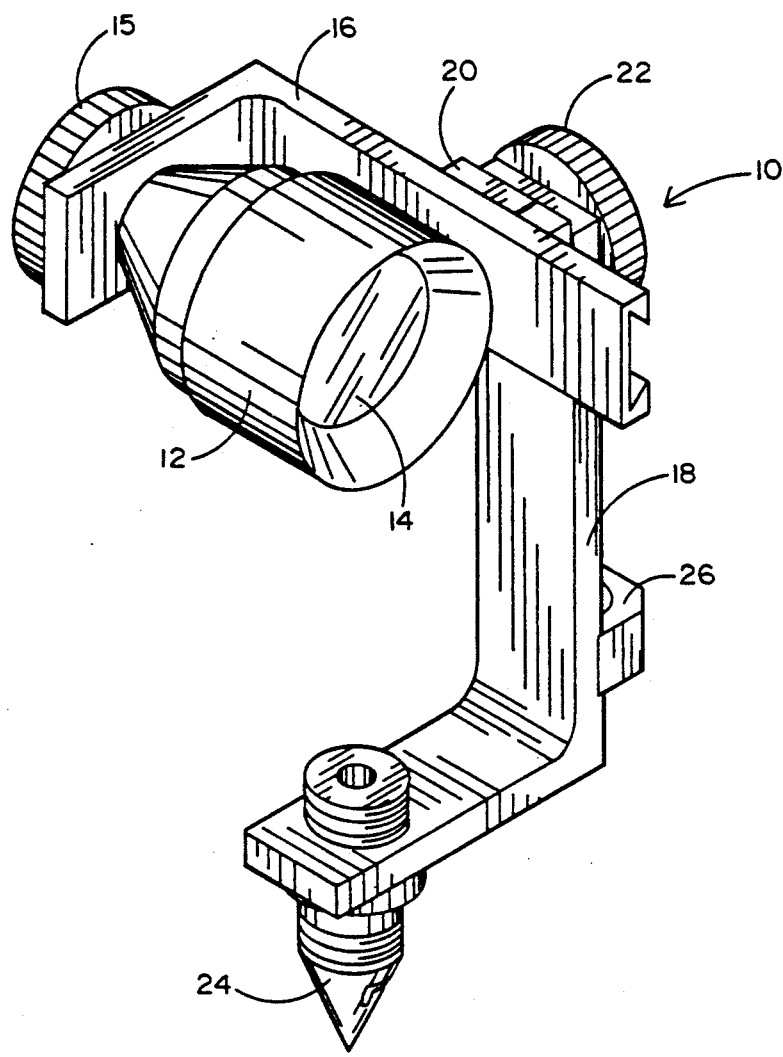
FIGS. 1-6 are isometric views of various prior art devices relevant to the present invention.

In order to fully understand the features and advantages of the present invention, reference will first be made to FIGS. 1-8 which show various configurations of prior art, all of which suffer from one or more deficiencies which the present invention is designed to overcome. More specifically, referring first to FIG. 11 it will be seen that the prior art prism assembly 10 provides a housing 12 having a prism 14 and connected by a knob screw 15 to a prism bracket 16. Prism bracket 16 is in turn mounted to a mounting bracket 18 which is provided with a bracket guide 20 which provides slideable engagement between bracket 18 and bracket 16 upon loosening of the knob screw 22 thereof. A plumb line adapter 24 and a level are attached at appropriate points to the mounting bracket One of the principal difficulties or disadvantages of the prior art prism assembly 10 of FIG. 1 is that there is no target provided to increase the ease of sighting the prism assembly from a long distance. This disadvantage is especially problematical because of the typically small size of the prism 14 which further increases the difficulty of pinpointing the prism from a distantly located distance measuring instrument. Furthermore, because the point at which prism housing 12 attaches to prism bracket 16 is so far from the fulcrum point of rotation of bracket 16 relative to bracket 18, in order to provide elevational control of the prism 14, it would be virtually impossible to place a target anywhere near the prism without interfering with its elevational adjustment capability. In addition, placement of a target any significant distance from the fulcrum point of bracket 16 with respect to bracket 18 would introduce a significant possibility of inaccuracy in the distance measuring process, particularly when the prism 14 were tilted to accommodate some elevational requirement. Thus, while the prior art prism assembly 10 shown in FIG. 1 provides certain advantages including the portability adjustability and plumb line features similar to the present invention, it lacks a significant feature of the present invention rendering it relatively disadvantageous as will be hereinafter more fully described.

Figure 2:
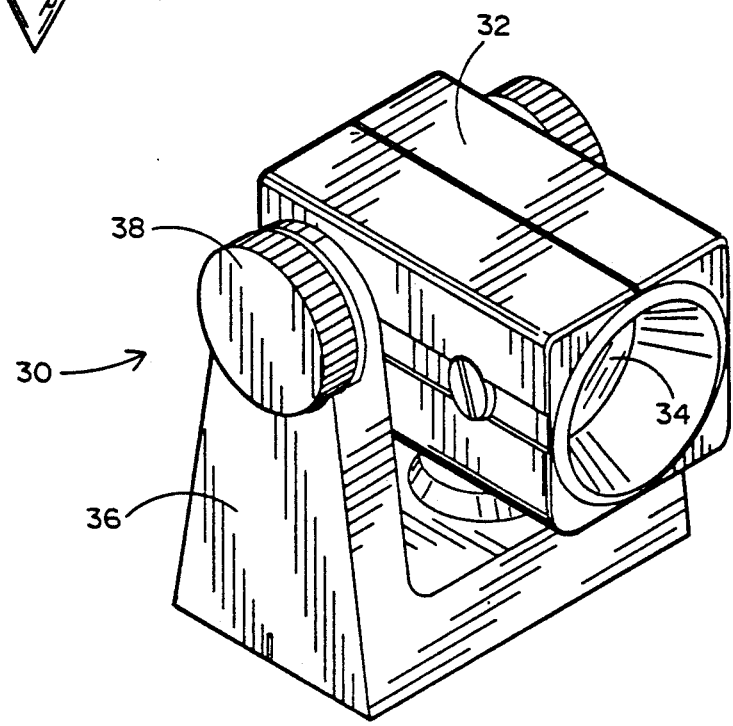

An even more disadvantageous prior art prism assembly is shown in FIG. 2. This second prior art assembly 30 provides a housing 32, a prism 34 and a yoke 36 with the housing 32 attached to the yoke 36 by means of a pair of knob screws 38. While the prior art prism assembly 30 provides elevational adjustment and the provision for selectable offset of 0 and 30 millimeters, there is no provision for a stationary target to improve the sighting capability from a distant measuring instrument and furthermore, there is no provision for stringing a plumb line.

Figure 3:
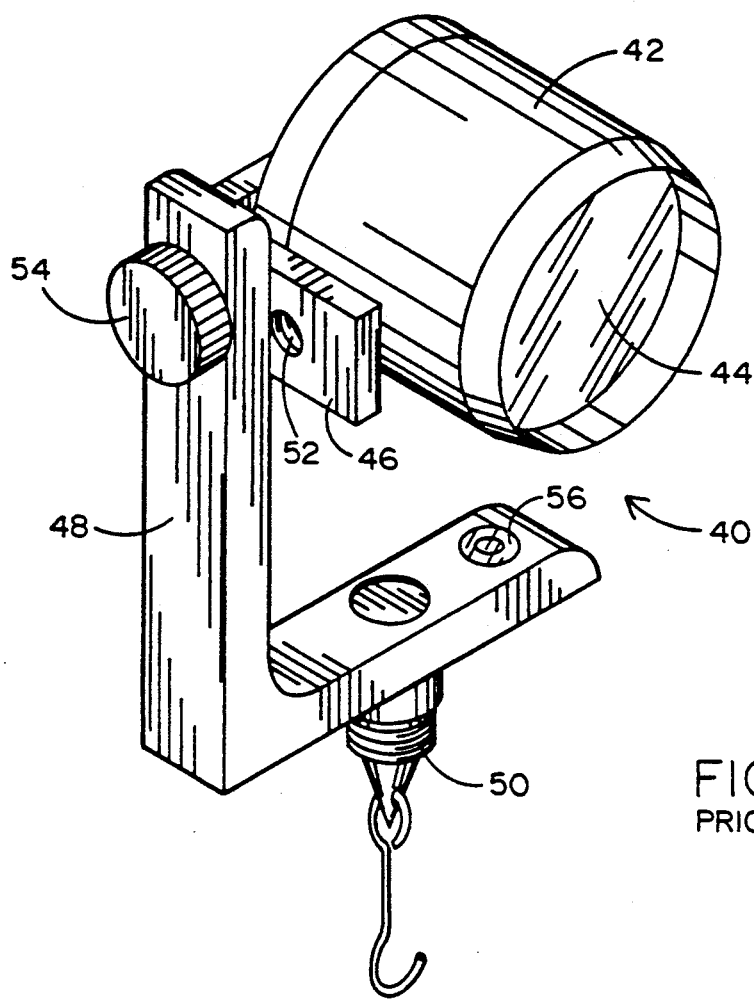

Still another prior art configuration is shown in FIG. 3. More specifically, third prior art prism assembly 40 shown in FIG. 3 comprises a housing 42, a prism 44, a prism bracket 46, a mounting bracket 48, a plumb line adapter 50 and level 56. The embodiment of FIG. 3 is very similar to the embodiment of FIG. 1. The prism housing 42 is attached to the prism bracket 46 which is in turn attached to the mounting bracket 48, the latter having a knob screw 54 designed to interface with one of two threaded holes 52 which provide either a 0 or 30 millimeter offset depending upon the mounting hole selected to interface with the knob screw 54. This prior art configuration suffers the same disadvantage of that of FIG. 1, namely, the virtual impossibility of integrating a sighting target into the prism assembly because of the nature of the bracket structure and the manner in which the prism 44 must be tilted for elevational adjustment.

Figure 4:
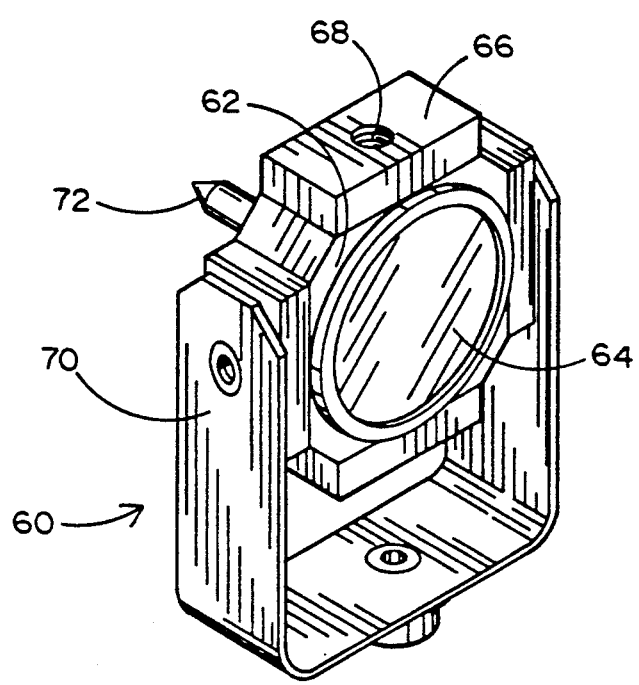

A fourth prior art configuration is shown in FIG. 4. Prior art prism assembly 60 provides a housing 62, a prism 64, prism brackets 66 each having a mounting hole 68, a mounting bracket 70 and a shaft 72. Prior art prism assembly 60 is very similar in effective configuration to that in FIG. 2 and thus suffers the same deficiencies, namely, the lack of a stationary target for sighting purposes and the lack of any provision for stringing a plumb line for vertical positioning. The one feature that the prior art assembly 60 of FIG. 4 provides, not shown in the previously described prior art configurations of prism assemblies, is that of a rearwardly extending shaft 72 which is of selected length and is provided for the purpose of positioning the prism assembly 60 a known distance from a fixed point such as a flat wall or recess to which a measurement of distance cannot otherwise be made conveniently. It will be seen hereinafter that the present invention not only overcomes the aforementioned deficiencies of the prior art but also provides a shaft of the type shown in FIG. 4 for accomplishing the same result.

Figure 5:
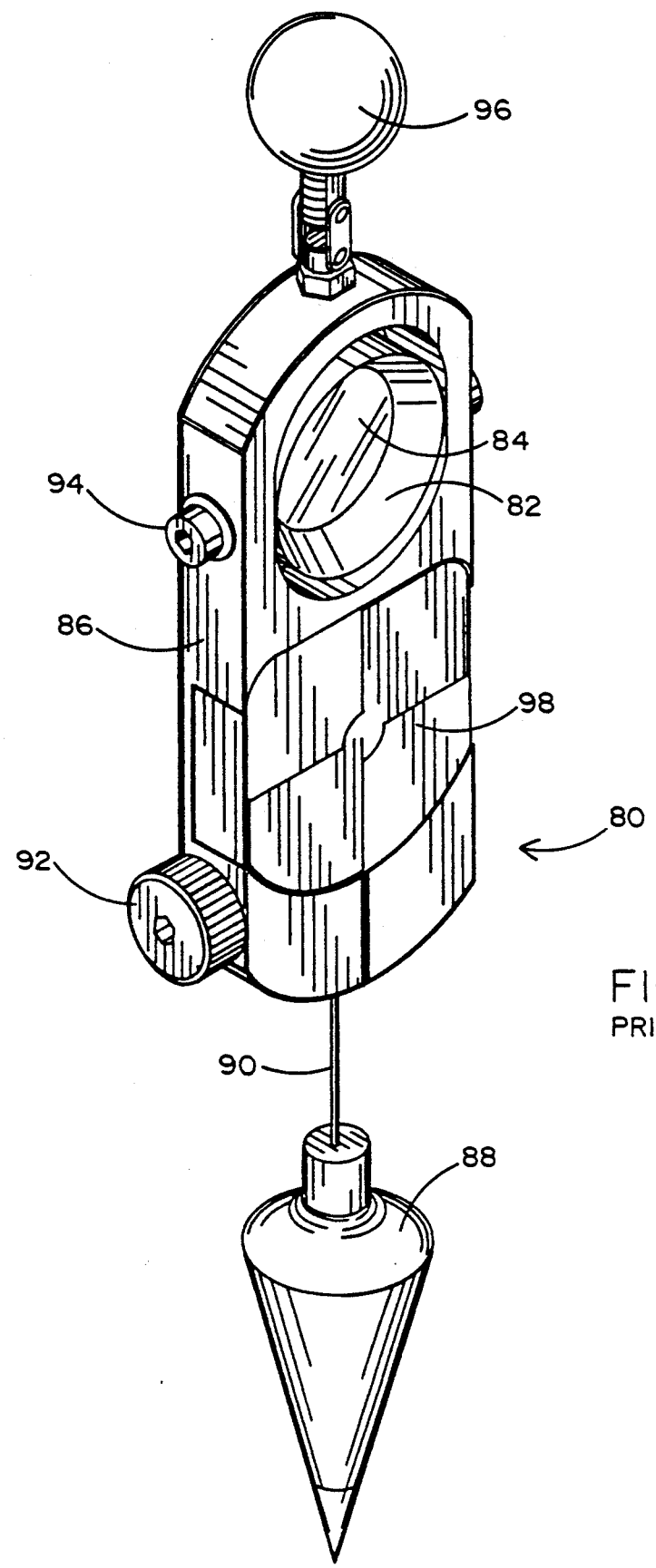

Still another prior art configuration is shown in FIG. 5. Prior art prism assembly 80 provides a housing 82, a prism 84, a plumb line housing 86 to which is attached a plumb 88 by means of a line 90. Also provided is a line release control 92, a pair of mounting bushings 94 and an articulatable handle 96. The semblance of a target 98 is also provided on the face of plumb line housing 86 below and displaced from the prism 84. The principal disadvantage of the prior art prism assembly 80 of FIG. 5 is that it provides no way of adjusting the prism offset between the standard 0 and 30 millimeter positions. Furthermore, although a target is provided, target 98 is not substantially larger than the prism itself and is primarily ornamental rather than functional. Furthermore, it is displaced from the prism and therefore could lead to inadvertent inaccuracy in the distance measuring process. Another disadvantage of the prior art assembly 80 of FIG. 5 is the limited elevational control and adjustability of the prism housing 82 relative to the plumb line housing 86. Another major disadvantage of the prior art configuration of FIG. 5 is the fact that the large and unwieldy nature of the overall configuration substantially defeats the portability and convenience aspects of the smaller prism assemblies to which other prior art and the present invention are directed. The mere size and weight of plumb 88 makes the overall configuration both heavy and cumbersome and renders it very difficult to physically stabilize the assembly 80 in a fixed position during the measurement process.

Figure 6:
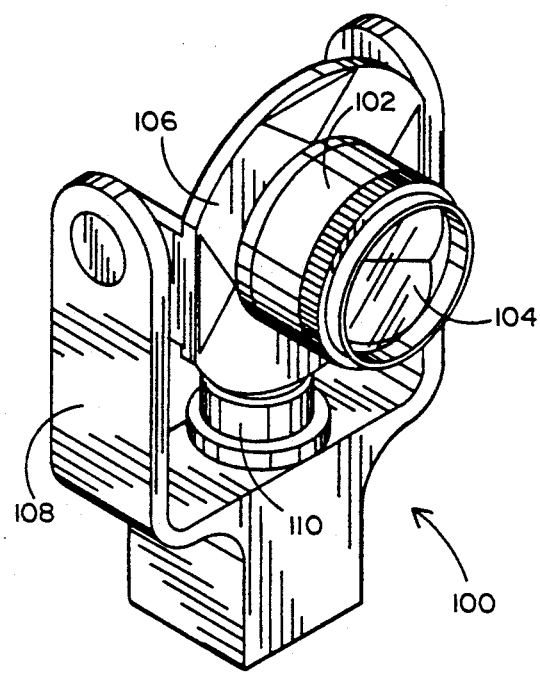
Figure 7:
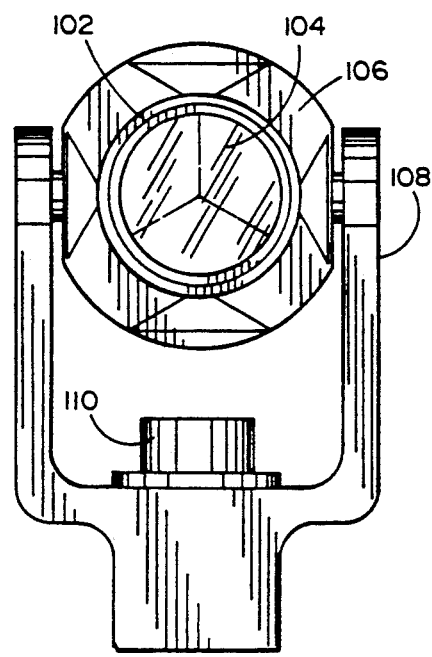
FIG. 7 is a front view of the prior art prism assembly of FIG. 6.
Figure 8:
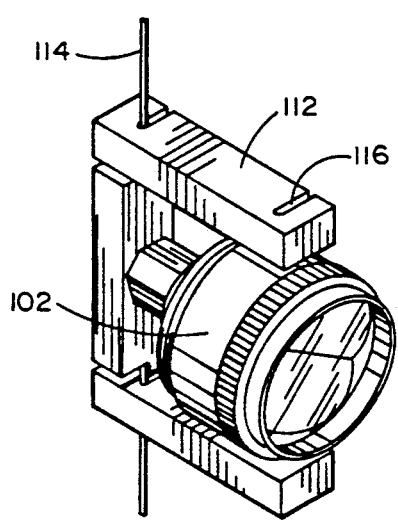
FIG. 8 is an isometric view of a reconfigured prior art prism assembly of FIG. 6 which must be provided in order to accommodate plumb line stringing.
Figure 9:
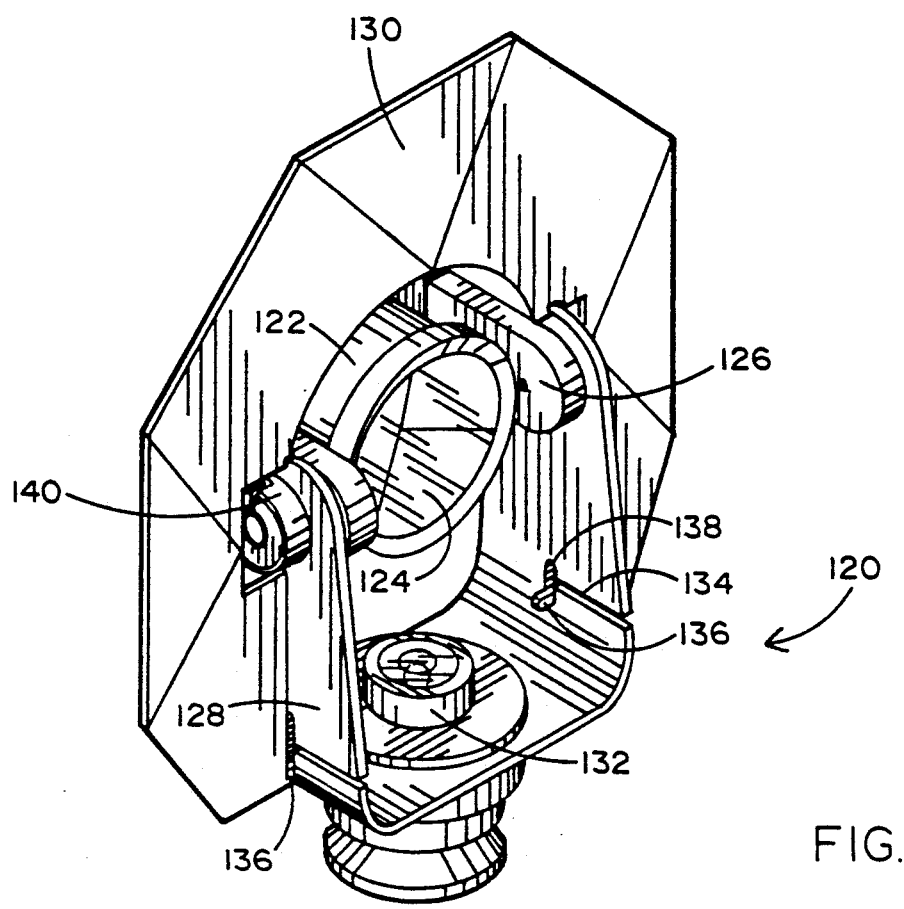
FIG. 9 is an isometric view of the present invention shown fully assembled with the stationary target attached thereto.

The most relevant prior art prism assembly is shown in FIGS. 6–8. More specifically, this prior art prism assembly 100 comprises a prism housing 102, a prism 104, a target 106, a mounting bracket 108 and a level 110. A separate and distinct plumb line holder 112 is also provided and this separate plumb line holder provides a plurality of grooves 116 to enable stringing of a plumb line 114 in the manner shown in FIG. 8. While the prior art prism assembly 100 of FIGS. 6–8 provides a number of features found in the present invention, it suffers from a significant disadvantage which as will be seen hereinafter is remedied by the present invention. More specifically, as seen in FIGS. 6 and 8, respectively, in order to string a plumb lined 114 from the prism assembly 100, it is necessary to remove the prism housing 102 from the target 106 and install it instead in a separate and distinct plumb line holder 112. The disadvantage is not only one of inconvenience, namely, requiring the user to carry an extra part and physically remove the housing and place it in the other part, but also one of accuracy in that the target does not accompany the prism housing when the latter is placed in the plumb line holder. Consequently, the user cannot use the target simultaneously with the plumb line to both vertically orient the prism and at the same time provide a target for visually sighting the assembly from a distance. Another important disadvantage of the prism assembly of FIGS. 6–8 is the small size of the target. Because of the way in which the target and prism housing are integrated into the mounting bracket 108, the target 106 can be only slightly larger than the prism housing itself and consequently reduces the efficacy of the target to a substantial extent.

Reference will now be made to FIG. 9 through 12 which fully illustrate the present invention. It will be seen in FIGS. 9–12, that the portable prism assembly 120 of the present invention comprises a prism housing 122, a prism 124, a housing pivot 126, a yoke 128, and a target 130. Target 130 is of a generally planar configuration and has perpendicular center lines which intersect the center of prism 124. The yoke 128 is provided with a built-in level 132 and an underlying bayonnet mount 146 to permit the assembly 120 to be mounted on a tripod and the like. The closed end of the prism housing 122 is threaded for mating with and extending through the housing bracket or pivot 126. This end of the prism housing is provided with a shaft 144 to permit the housing to be oriented a predetermined accurate distance from a surface such as a flat wall or the like. The legs of the housing pivot 126 are rotatably secured to the legs of the yoke 128 by a pair of bushings 140. The prism assembly 120 of the present invention provides for selection of either 0 or 30 millimeter offset by simply reversing the threaded engagement between the prism housing and the housing pivot and rotating the housing pivot 180 degrees. In addition, because the housing pivot 126 is rotatably engaged with the yoke 128, the prism 124 may be placed in any desired elevational position.

Figure 10:
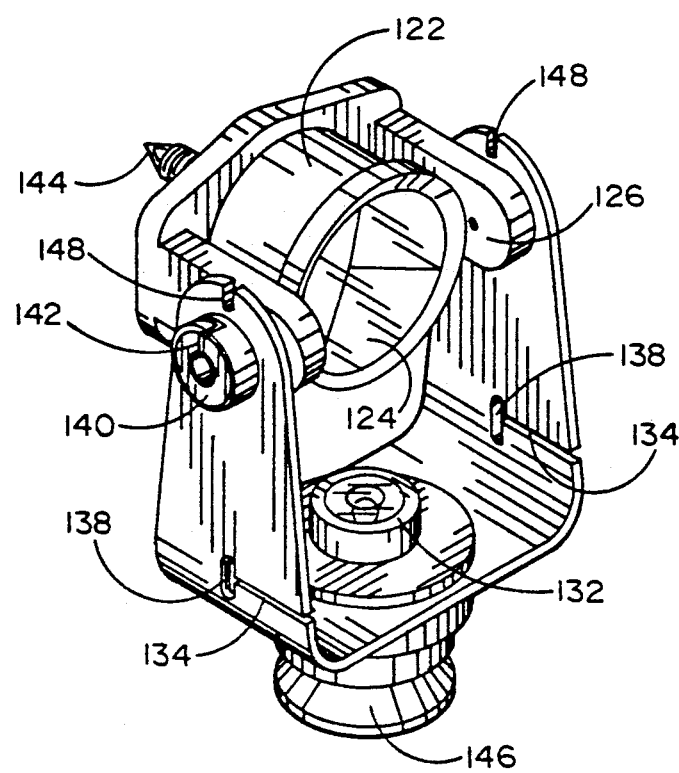
FIG. 10 is an isometric view of the present invention with the stationary target of FIG. 9 removed.
Figure 11:
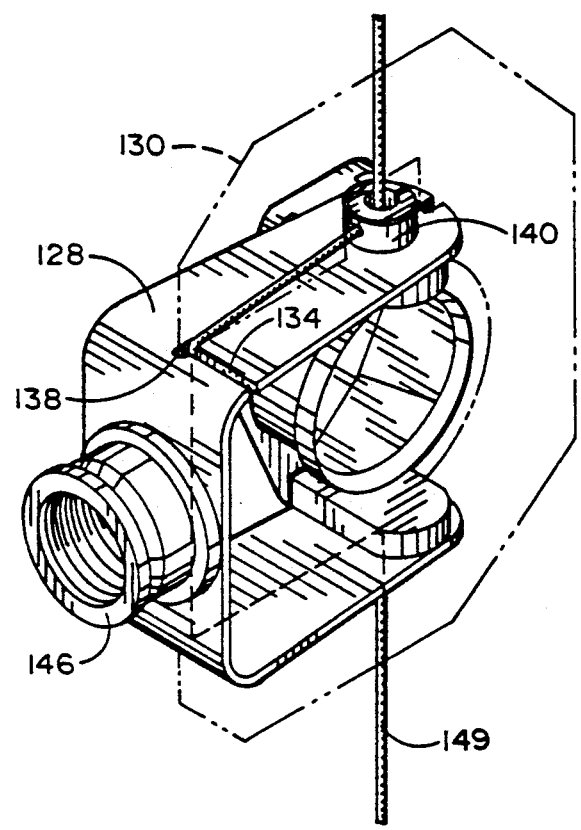
FIG. 11 is an isometric view of the present invention showing the target thereof in phantom and illustrating the manner in which the present invention may be strung for a plumb line.

As seen best in FIG. 10, yoke 128 is provided with a pair of channels 134 which terminate in a pair of slots 138. In addition, yoke 128 is provided with a pair of grooves 148 at the uppermost portion thereof. Grooves 148 are designed to stabilize and position the target 130 on the yoke in the manner shown in FIG. 9. Channels 134 and slots 138 provide a dual purpose, the first of which is to facilitate easy and simple installation and retention of the target 130 on the yoke 128 by providing a path for insertion of a pair of tabs 136 at the base of the target 130 seen best in FIGS. 9 and 12. An additional purpose of channels 134 and slots 138 is to provide an easy means for stringing a plumb line around the yoke 128 in the manner shown in FIG. 11. Also provided to facilitate the stringing of the plumb line and the proper centering of the plumb line is a string path 142 in each of the bushings 140 which also connects the yoke 128 to the housing pivot 126. The manner in which the plumb line is actually strung through the present invention is shown in FIG. 11 with the target shown in phantom to avoid obfuscation of the interface between the plumb line string 149 and the yoke 128. As seen in FIG. 11, during a plumb line usage with the present invention, the yoke 128 is preferably turned on its side 90 degrees from the standard configuration shown in FIGS. 9 and 10. The bushings 140 effectively align the plumb line with the center of the prism while providing a 90 degree turn to facilitate stringing of the line through and around the periphery of the yoke 128. Additional 90 degree turns of the line are provided by slots 138 to which the plumb line can be easily threaded by means of channels 134. In this manner, the plumb line can be aligned with the prism while using the bushings 140 and the slots 138 to be threaded around the prism along the exterior sides and interior bottom of the yoke 128.

Figure 12:
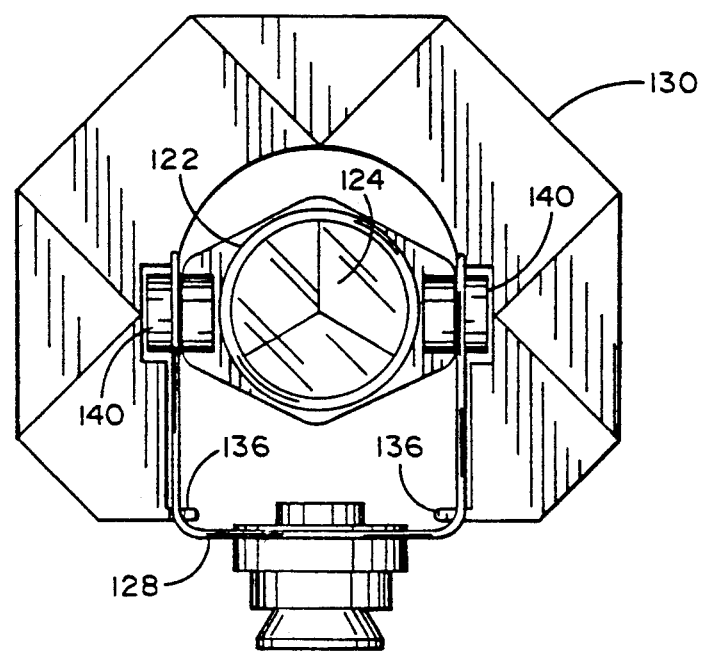
FIG. 12 is a front elevational view of the present invention.

The elevational view of FIG. 12 provides an illustration of the manner in which the target 130 interfaces with the yoke 128 and specifically, the manner in which the tabs 136 are positioned within the slots 138 when the target is in place on the yoke.

Thus, it will be seen that the present invention is an integrated unitary miniature prism assembly providing a prism which can be adjusted for 0 or 30 millimeter offset, which can be varied to virtually any elevational angle, which provides a means for stringing a plumb line without removing any portion of the unit such as the reflective prism or housing from the yoke. It can be strung while a stationary target remains attached to the yoke by employing novel stringing slots which are part of the same mechanism. The stationary target may be easily mounted and once mounted, doesn't move even when the prism is tilted thereby improving the accuracy of the distance measurement using the present invention. Thus it will be seen that the present invention provides all of the individual features provided by the combination of the prior art prism assemblies shown in FIGS. 1–8 while at the same time providing additional capabilities and overcoming the deficiencies of each of such prior art assemblies.

Those having skill in the art to which the present invention pertains will now, as a result of the applicants' teaching herein, perceive various modifications and additions which may be made to the invention. By way of example, while the present invention has been described as a miniature portable prism assembly, it will be understood that the novel concepts disclosed herein may be equally applicable to larger prism assemblies including those of conventional three inch diameter configuration. It will also be understood that the various shapes disclosed herein may be modified without deviating from the principal objects and without minimizing the advantages resulting therefrom. Consequently, all such modifications and additions are deemed to be within the scope of the invention which is to be limited only by the claims appended hereto.

We claim:

1. A retro-reflective prism assembly for use in conjunction with distance measurement instruments, the assembly of the type having a retro-reflective prism and a housing for retaining the prism; the assembly comprising:
   a housing bracket for retaining said housing;
   a yoke; said housing bracket being rotatably connected to said yoke for elevational tilting of said housing; and
   a generally planar target defining perpendicular center lines intersecting the center of said prism; said target being removeably affixed to said yoke and remaining stationary relative to said housing during tilting of said housing;
   said yoke having means for stringing a plumb line for ascertaining the vertical position of said housing relative to a predetermined point below the assembly, said plumb line defining a mathematical line intersecting said housing, but being strung around the periphery of said yoke.

2. The assembly recited in claim 1 wherein said stringing means comprises means for stringing said plumb line without requiring removal of said target from said yoke.

3. The assembly recited in claim 1 wherein said yoke comprises a pair of bushings securing said housing bracket to said yoke and wherein said stringing means comprises a string path in each of said bushings and slots in said yoke for stringing said plumb line around the periphery of said yoke.

4. The assembly recited in claim 3 wherein each said string path and each said slot provides means for changing the direction of said plumb line by about 90 degrees.

5. The assembly recited in claim 3 wherein said yoke further comprises a respective channel associated with each of said slots, each said channel leading from an edge of said yoke to its associated slot to permit placement of said plumb line into said slots during stringing of said plumb line.

6. The assembly recited in claim 3 wherein said target comprises a plurality of tabs, each such tab being associated with a respective one of said slots and extending therethrough for securing said target to said yoke.

7. The assembly recited in claim 1 wherein said housing provides a first distance measurement offset when retained in said housing bracket in a first direction and provides a second distance measurement offset when retained in said housing bracket in a second direction.

8. A retro-reflective prism assembly for use in conjunction with distance measurement instruments, the assembly of the type having a retro-reflective prism and a housing for retaining the prism; the assembly comprising:
   a U-shaped housing bracket having legs and a threaded aperture for receiving said housing;
   a U-shaped yoke having legs and a pair of bushings connecting the legs of said yoke to the legs of said housing bracket, respectively, for relative rotation therebetween;
   said bushings and said yoke legs providing a path for stringing a plumb line around said housing, said plumb line defining a mathematical line passing through said prism for vertically positioning said prism.

9. The assembly recited in claim 8 further comprising a target defining center lines passing through said prism, said target having means for attachment to said yoke.

10. The assembly recited in claim 9 wherein said target also provides means for remaining stationary on said yoke during rotation of said housing bracket relative to said yoke.

11. A retro-reflective prism assembly for use in conjunction with distance measurement instruments, the assembly of the type having a retro-reflective prism and a housing for retaining the prism; the assembly comprising:
   a housing bracket for retaining said housing;
   a yoke; said housing bracket being rotatably connected to said yoke for elevational tilting of said housing; and
   a generally planar target defining perpendicular center lines intersecting the center of said prism; said target being removeably locked to said yoke without fasteners and remaining stationary relative to said housing during tilting of said housing.

* * * * *